(12) United States Patent
Sato et al.

(10) Patent No.: US 7,802,920 B2
(45) Date of Patent: Sep. 28, 2010

(54) STATIC-PRESSURE GAS BEARING MECHANISM

(75) Inventors: Soichi Sato, Tsukubamirai (JP); Takashi Abe, Tsukubamirai (JP); Eiko Miyasato, Tsukubamirai (JP); Migaku Takahashi, Sendai (JP); Masakiyo Tsunoda, Sendai (JP)

(73) Assignees: SMC Corporation, Tokyo (JP); Tohoku University, Sendai-shi (JP)

( * ) Notice: Subject to any disclaimer, the term of this patent is extended or adjusted under 35 U.S.C. 154(b) by 848 days.

(21) Appl. No.: 11/552,680

(22) Filed: Oct. 25, 2006

(65) Prior Publication Data

US 2007/0110347 A1    May 17, 2007

(30) Foreign Application Priority Data

Nov. 11, 2005   (JP)   ............................. 2005-327822

(51) Int. Cl.
F16C 17/00   (2006.01)
F16C 32/06   (2006.01)
(52) U.S. Cl. .......................................... 384/8; 384/12
(58) Field of Classification Search .................... 384/8, 384/12, 100, 114, 119, 247, 252, 253, 257, 384/448, 519, 583; 251/61, 61.1, 61.2, 331, 251/335.2
See application file for complete search history.

(56) References Cited

U.S. PATENT DOCUMENTS

| | | | | |
|---|---|---|---|---|
| 3,014,765 A | * | 12/1961 | Mottn | 384/8 |
| 3,741,247 A | * | 6/1973 | Kaemmer | 137/625.66 |
| 4,569,562 A | * | 2/1986 | Sato et al. | 384/12 |
| 4,571,129 A | * | 2/1986 | Strand | 408/54 |
| 6,695,479 B2 | * | 2/2004 | Pohn et al. | 384/100 |

* cited by examiner

Primary Examiner—Thomas R Hannon
Assistant Examiner—James Pilkington
(74) Attorney, Agent, or Firm—Oblon, Spivak, McClelland, Maier & Neustadt, L.L.P.

(57) ABSTRACT

A first and a second static-pressure gas bearings supporting a rod at two locations in the axial direction in the non-contact manner are provided, in which the first static-pressure gas bearing is fixedly supported by a bearing housing, while the second static-pressure gas bearing is supported capable of displacement through a movable support mechanism. And this movable support mechanism has an actuator and suppresses contact of the rod with the static-pressure gas bearings by displacing the shaft center of the second static-pressure gas bearing with respect to the first static-pressure gas bearing by this actuator according to a load acting on the rod.

6 Claims, 4 Drawing Sheets

STATIC-PRESSURE GAS BEARING MECHANISM

BACKGROUND OF THE INVENTION

1. Field of the Invention

The present invention relates to a static-pressure gas bearing mechanism to which an anti-moment measure is applied for a rod to which a fluctuating load acts and more specifically, a static-pressure gas bearing mechanism suitable for support of the rod for straight conveyance of a work used in a vacuum environment or a clean environment.

2. Description of the Related Art

In general, a straight conveying device usable in a vacuum environment or a clean environment such as a clean room is provided with the above rod for conveyance, and a contact-supporting method such as a slide bearing, a ball bush or the like is used at a bearing portion of the rod to handle dust generation at the bearing portion as necessary. When the bearing portion is in the contact supporting type in this way, dust generation can not be prevented basically and moreover, generation of dust is increased by rise of a rod driving speed, which causes problems of lowered cleanliness, accelerated bearing abrasion and drop of device durability.

In order to avoid these problems, it is necessary to limit a shift to high speed of the driving speed, and it lowers work processing productivity.

On the other hand, support of the rod with a non-contact support type static-pressure gas bearing has been extremely widely known. If this non-contact support type static-pressure gas bearing is applied to the support of the rod in the above-mentioned conveying device, dust generation can be suppressed to the minimum and high-speed conveying of works in a vacuum environment and a clean environment becomes possible.

However, due to the weight of the rod or an external force acting on the rod, a moment acts on a support portion of the rod supported by a static-pressure gas bearing, by which a part of the rod might be brought into contact with the static-pressure gas bearing. In this case, similar problems to the above contact support type will occur.

BRIEF SUMMARY OF THE INVENTION

A technical object of the present invention is to provide an anti-moment static-pressure gas bearing mechanism which solves the above problems and has a rod on which a fluctuating load acts supported while suppressing drop of cleanliness and progress of bearing abrasion due to dust generation so that suppression of drop of the cleanliness and improvement of driving speed are realized.

Another technical object of the present invention is to provide a static-pressure gas bearing mechanism suitable for support of a rod used for straight conveyance of a work and the like in a vacuum environment and a clean environment.

The anti-moment static-pressure gas bearing mechanism of the present invention in order to solve the above problems comprises a rod driven in an axial direction inside a bearing housing and a first and a second static-pressure gas bearings disposed at two locations in the axial direction of the rod for supporting the rod in the non-contact manner through an air layer, in which the first static-pressure gas bearing is fixedly supported by the bearing housing and the second static-pressure gas bearing is supported capable of displacement by the bearing housing through a movable support mechanism. The movable support mechanism has an actuator for displacing the shaft center of the second static-pressure gas bearing with respect to the first static-pressure gas bearing and a control device for driving the actuator, and it is so constructed that the contact of the rod with the both static-pressure gas bearings is suppressed by displacing the shaft center of the second static-pressure gas bearing by driving the actuator by the control device according to a load acting on the rod so as to displace the shaft center of the second static-pressure gas bearing.

In the present invention, the above rod is a working rod arranged horizontally and having a working instrument at the tip end, and a moment acting on the rod caused by one or both of the weight of a portion of the control device protruding from the static-pressure gas bearing of the rod and the external force acting on the working instrument is made as the above load, and this load is calculated according to a driving program of the rod and the actuator is driven based on the calculation result.

In the present invention, the actuator is preferably provided with a pressure receiving member supporting the second static-pressure gas bearing, and the control device is constructed to control a position of the second static-pressure gas bearing through the pressure receiving member by controlling a fluid pressure supplied to the both face sides of the pressure receiving member from a pressure regulating valve.

Also, in the present invention, a contact detector for detecting contact of the rod is provided at both ends of the first static-pressure gas bearing, and the control device may be provided with a control function for a stop operation of the rod or a removing operation of the dust generated by the contact on the basis of a rod contact signal from the contact detector.

In the present invention, it is preferable that the fixed type first static-pressure gas bearing is disposed in the front of the rod and the displacement type second static-pressure gas bearing is disposed in the rear of the rod.

Also, an air supply port for supplying a compressed air for forming an air layer for the first and the second static-pressure gas bearings, respectively, and a suction port for discharging the supplied compressed air in the vicinity of each of the static-pressure gas bearings by suction are preferably provided.

In the static-pressure gas bearing mechanism of the present invention having the above construction, if it is known in advance that the weight of a portion of the rod protruding from the static-pressure gas bearing is changed with the axial driving of the rod or that an external force or the like acts on the working instrument at the tip end of the rod, a moment on the basis of them can be obtained in advance by calculation by the control device, and by driving the actuator of the second static-pressure gas bearing on the basis of the calculation result, that is, by supplying/discharging a required air pressure on the both face sides of the pressure receiving member supporting the second static-pressure gas bearing from a pressure regulating valve controlled by the control device so as to give required displacement to the shaft center of the second static-pressure gas bearing, a part of the surface of the rod supported by the two static-pressure gas bearing is prevented from contacting those static-pressure gas bearings.

Therefore, to a static-pressure gas bearing characteristic whose shaft-support capability is drastically lowered at generation of a moment in the rod, a load to offset the generated moment is applied through the actuator in the movable support mechanism of the second static-pressure gas bearing, thereby a reduction characteristic of the static-pressure gas bearing support capability can be avoided, the bearing support capability will not drastically drop but non-contact support of the rod by the static-pressure gas bearing mechanism is made possible.

Also, if the contact detector for detecting the contact with the rod is provided at both ends of the first static-pressure gas bearing, and the control device for controlling driving of the rod is provided with a driving control function of the rod on the basis of a contact signal of the rod detected by the contact detector, intrusion of dust into the vacuum environment or the a clean environment can be prevented.

As mentioned above in detail, according to the static-pressure gas bearing mechanism of the present invention, the rod on which a fluctuating load acts can be supported while suppressing drop of the cleanliness and progress of bearing abrasion due to dust generation, suppression of the cleanliness drop and improvement of the driving speed can be realized, and the static-pressure gas bearing mechanism suitable for support of the rod for straight conveying of a work used in the vacuum environment and the clean environment can be obtained. Also, a state where dust might be generated by contact between the rod and the bearing is detected, and dust generation can be suppressed in an emergency manner.

DETAILED DESCRIPTION OF THE INVENTION

Figure 1:
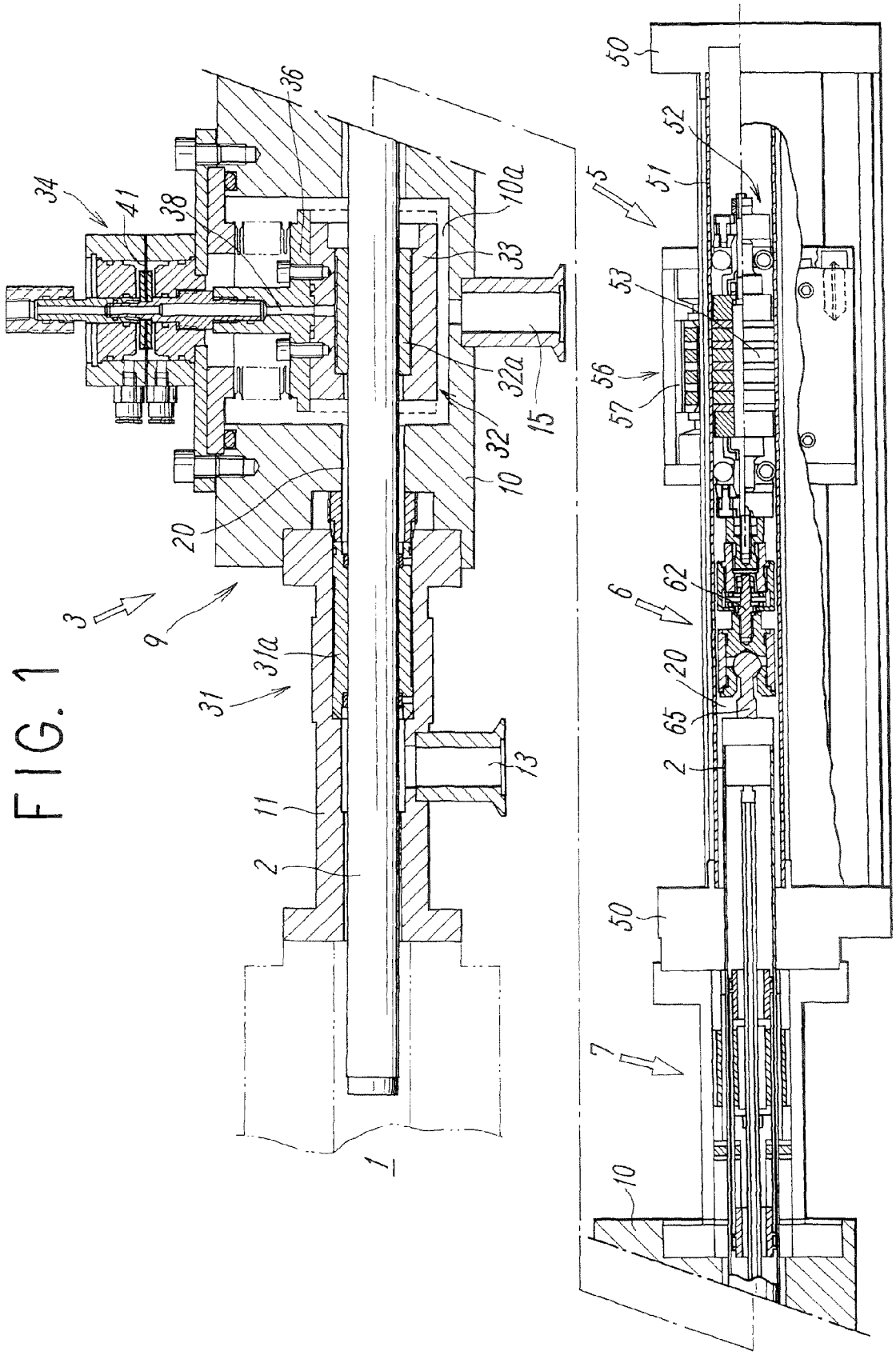
FIG. 1 is a longitudinal sectional view showing an entire construction of an embodiment of a conveying device for vacuum provided with a static-pressure gas bearing mechanism according to the present invention.

FIG. 1 shows an example of an embodiment in which the static-pressure gas bearing mechanism according to the present invention is applied to a conveying device for vacuum.

As can be seen from the figure, the conveying device for vacuum comprises in an outline manner a working rod 2 for horizontal driving for conveying in/out of a work with respect to a vacuum process chamber 1 provided for manufacture of semiconductors and the like, and a tray (not shown) is mounted at the tip end of the rod 2 so as to drive the rod 2 in its axial direction, and it also comprises a static-pressure gas bearing mechanism 3 according to the present invention for supporting the horizontally arranged rod 2, a driving mechanism 5 for driving the rod 2 in its axial direction, a floating joint 6 for connecting a driving shaft of the driving mechanism 5 and the rod 2, and a rotation suppression mechanism 7 for suppressing rotation of the rod 2.

The driving system including the rod 2 is arranged in a rod housing cylindrical portion 20 communicating with the process chamber 1 and constituting a vacuum system, and they are isolated from an outside environment.

More specifically, the rod 2, a housing member in a cylindrical portion in the rotation suppression mechanism 7 communicating with that, the floating joint 6, an internal moving body 52 in the driving mechanism 5 and the like are in the rod housing cylindrical portion 20 formed inside a support block 10, a bearing block 11, a tube 51 and the like, which will be described below.

Here, the rod 2 will be described as a rod with the tray mounted at the tip end driven in the axial direction for conveying a work, but the rod 2 is not limited to the one for conveying the work but it may be an arbitrary working rod by providing various working instruments at the tip end of the rod 2.

Figure 2:
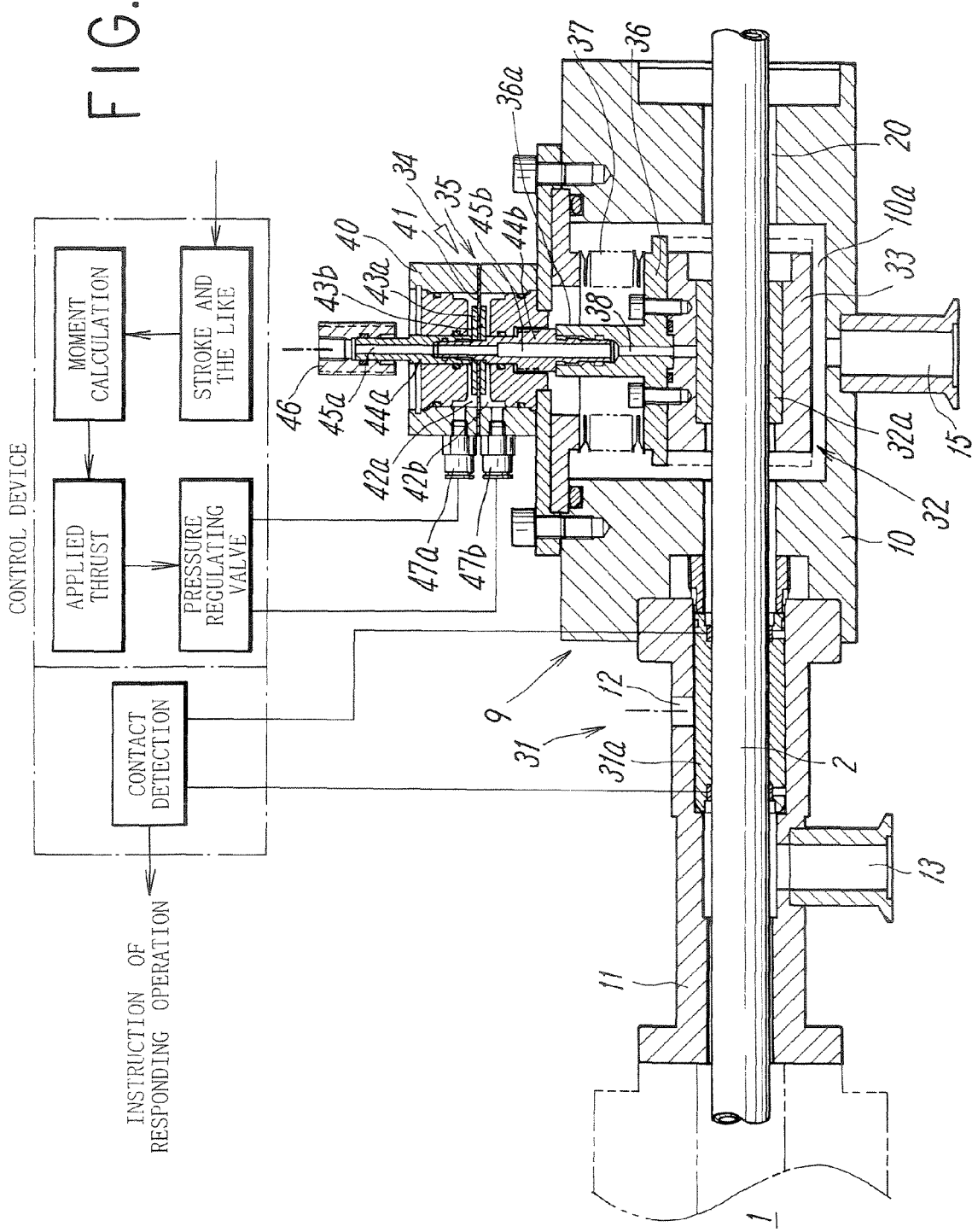
FIG. 2 is a longitudinal sectional view including a control system of the static-pressure gas bearing device according to the embodiment.

The static-pressure gas bearing mechanism 3 supporting the rod 2 is, as clearly shown in FIG. 2, provided with a first and a second static-pressure gas bearings 31, 32 supporting the rod 2 at two locations with an interval in the axial direction, and these static-pressure gas bearings are supported by a bearing housing 9 in a fixed manner. The first static-pressure gas bearing 31 of them is fixedly supported by the bearing housing 9. That is, the first static-pressure gas bearing 31 is constituted by providing the bearing block 11 protruded from the support block 10 installed on a base, not shown, for the second static-pressure gas bearing 32 toward the front of the rod 2 and by housing a bearing member 31a within this bearing block 11.

The bearing member 31a is made of a porous material and so constructed that a micro clearance is interposed between it and the rod 2 and the rod is supported in the non-contact manner through an air layer formed in the clearance, and an air supply port 12 for supplying a compressed air for forming the air layer is provided in the bearing block 11.

Also, on the chamber 1 side of the bearing member 31a in the bearing block 11, a suction port 13 is opened for suction/discharge of the air supplied from the air supply port 12.

If appropriate suction is not made at this suction port 13, the air supplied from the air supply port 12 in the first static pressure gas bearing 31 flows into the process chamber 1, which makes maintenance of vacuum in the chamber 1 difficult. Therefore, the process chamber 1 and the inside of the suction port 13 are made to communicate with each other through a micro ventilation section, and the portion of the suction port 13 is set with a pressure slightly lower than the pressure in the chamber 1 by a vacuum pump connected to the portion so that the air inflow from the first static-pressure gas bearing 31 into the chamber 1 can be suppressed. As a result, vacuum maintenance in the process chamber 1 is made possible and moreover, cleanliness can be ensured by preventing dust inflow into the process chamber by an exhaust from the suction port 13. Also, the suction from this suction port 13 should be such that the degree of vacuum in the process chamber 1 is ensured and a bearing back pressure is ensured while air is discharged from the first static-pressure gas bearing 31 so as to enable non-contact support of the rod.

On the other hand, the second static-pressure gas bearing 32 is constituted by disposing a bearing block 33 housing a bearing member 32a at a position closer to the rear side of the rod 2 from the first static-pressure gas bearing 31, that is, in a bearing chamber 10a formed within the support block 10 on the side opposite to the process chamber 1 with respect to the first static-pressure gas bearing 31 and is supported by a variable support mechanism 34 capable of vertical displacement.

The bearing member 32a housed in the bearing block 33 is made of a porous material as with the bearing member 31a in the above first static-pressure gas bearing 31, and a micro clearance is interposed between it and the rod 2 so that the rod 2 is supported in the non-contact manner through the air layer formed in the clearance.

The movable support mechanism 34 is to relatively displace the shaft center of the second static-pressure gas bearing 32 with respect to the first static-pressure gas bearing 31 in a direction to suppress contact of a part of the surface of the rod 2 supported by the first and the second static-pressure gas bearing 31, 32 with the bearing member 31a or 32a in their static-pressure gas bearings 31, 32 according to a fluctuating load (moment) acting on the rod 2, and it is provided with an actuator 35 for the displacement.

When described more specifically, the bearing block 33 of the second static-pressure gas bearing 32 isolates a space in the bearing chamber 10a outside a movable seal member 37 from the outside by suspending the periphery of a connecting member 36 connected to the upper face by the movable seal member 37 made of a bellows to around an upper-part opening in the bearing chamber 10a within the support block 10 and connects the space to the vacuum pump by the suction port 15 opened in an inner bottom of the bearing chamber 10a.

Also, the connecting member 36 has an air supply port 38 at its center, which communicates with the periphery of the bearing member 32a through the opening of the bearing block 33, and a compressed air for forming the air layer between the bearing member 32a and the surface of the rod 2 is supplied through the air supply port 38. The compressed air supplied into the bearing member 32a through the air supply port 38 and discharged into the bearing chamber 10a is sucked and discharged from the suction port 15 but it should be such that the bearing back pressure is ensured and a pressure relation for enabling non-contact support of the rod 2 can be maintained even while this air discharge is being carried out.

On the support block 10, as mentioned above, the actuator 35 is provided constituting the movable support mechanism 34 for displacing the shaft center of the second static-pressure gas bearing 32. This actuator 35 is provided with pressure chambers 42a, 42b divided vertically by a diaphragm 41 as a pressure receiving member in the housing body 40 fixed on the support block 10, diaphragm shafts 44a, 44b set up on the diaphragm 41 through fixing plates 43a, 43b are slidably supported by the housing body 40 through a seal, and in the diaphragm shafts 44a, 44b, vent holes 45a, 45b communicating with the air supply port 38 provided at the connecting member 36 are provided. At the tip end of the diaphragm shaft 44a leading outside, a joint 46 for connection to a supply source of the compressed air is connected, and the diaphragm shaft 44b extending to the bearing block 33 side has its tip end connected to a projecting shaft portion 36a set up on the connecting member 36. Moreover, the pressure chambers 42a, 42b in the housing body 40 divided by the diaphragm 41 are connected to a pressure regulating valve outputting a fluid pressure controlled by the control device through pipe joints 47a, 47b, respectively.

Therefore, by the movable support mechanism 34, the diaphragm 41 of the actuator 35 is vertically driven by the fluid pressure outputted from the pressure regulating valve, and by a balance of air pressure supplied/discharged on the both face sides of the diaphragm 41, the bearing block 33 is displaced to a control position in the vertical direction through the diaphragm shafts 44a, 44b connected to the diaphragm 41 and the connecting member 36.

The actuator 35 is only necessary to be able to adjust the shaft center of the second static-pressure gas bearing 32 according to the moment amount acting on the rod 2, and therefore, as the pressure receiving member, not only the diaphragm 41 but a cylinder or the like working the controlled fluid pressure on the both sides of the piston may be used.

In this way, the bearing block 33 housing the bearing member 32a is supported by the diaphragm 41 through the diaphragm shafts 44a, 44b and the connecting member 36 as well as by the movable seal member 37 made of a bellows, but since a very small spring constant is used as the movable seal member 37, the support action is extremely small and as a result, the position of the bearing block 33 is controlled by the movable support mechanism 34. Even if a thrust acts on the bearing block 33 by the bellows, it can be offset by the force of the actuator 35.

The control device is to execute control so that the required fluid pressure is supplied to the pressure chambers 42a, 42b in the actuator 35 by the pressure regulating valve according to the load (moment) acting on the rod 2. The load acting on the rod consists of the weight of a portion of the rod 2 protruding from the static-pressure gas bearing 31 to the process chamber 1 side, fluctuating with the axial driving of the rod 2, and a moment on the basis of the external force acting on the working instrument mounted at the tip end of the rod 2, for example, and it is a moment calculated in advance in the control device according to a driving program of the rod 2 in the control device such as a movement position of the internal moving body 52 in the driving mechanism 5 and the external force applied to the tip end of the rod 2, and the second static-pressure gas bearing 32 has the actuator 35 driven on the basis of the calculation result.

This driving is to relatively displace the shaft center of the second static-pressure gas bearing 32 with respect to the first static-pressure gas bearing 31 in a direction to suppress the contact of a part of the surface of the rod 2 supported by the two static-pressure gas bearings 31, 32 with the bearing members 31a, 32a of those static-pressure gas bearings 31, 32, and specifically, in the case of driving in the axial direction of the rod 2 to protrude to the process chamber 1 side, for example, and when the moment acting on it is increased, the displacement is made in the direction to press down the bearing block 33 by the movable support mechanism 34.

Figure 3:
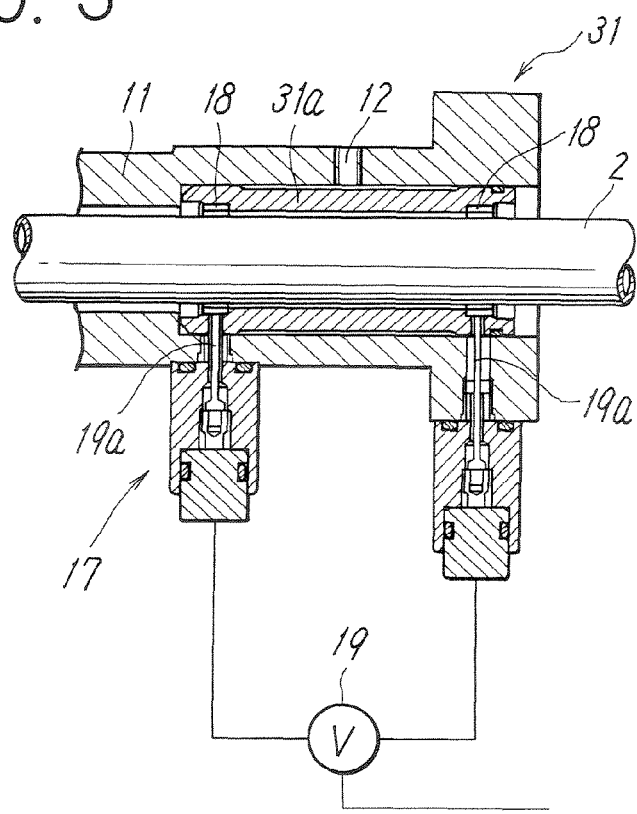
FIG. 3 is a partially enlarged longitudinal sectional view of a contact detector in the static-pressure gas bearing mechanism.

Also, as shown in FIGS. 2 and 3, at the first static-pressure gas bearing 31, a contact detection mechanism 17 of the rod 2 is provided.

This contact detection mechanism 17 is to carry out removal operation of generated dust as the contact detector for detecting the contact with the rod 2 at the both ends of the bearing member 31a having a certain clearance to the rod 2, in which conductive bodies 18, 18 electrically conducted when the rod 2 is inclined and brought into contact are disposed, and a voltage is applied between those conductive bodies 18, 18 and the rod 2 through a conductive terminal 19a from a power supply 19. And contact is detected in the control device from voltage change by the contact and a required responding operation on the basis of a contact signal of the rod by the contact detection mechanism 17 such as dust elimination operation of generated dust on the basis of the driving stop or the above contact of the rod 2, for example.

As the control device for detecting contact in the contact detector, a control device which is common to that for displacing the shaft center of the above-mentioned second static-pressure gas bearing 32 is used, or a different control device may be used.

Figure 4:
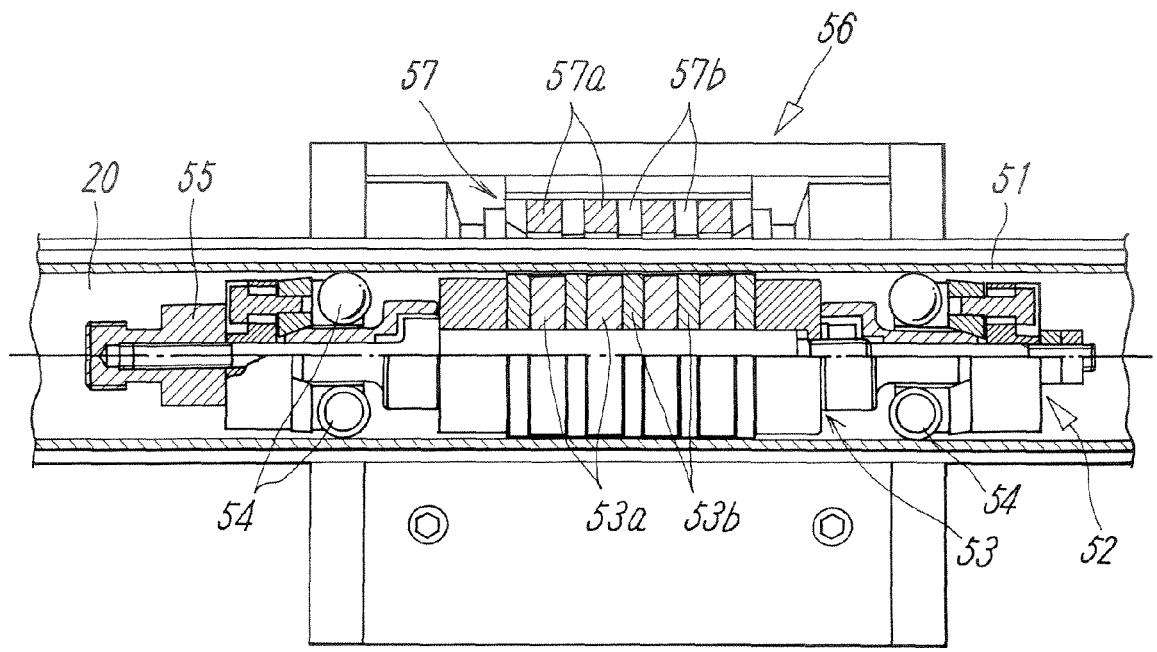
FIG. 4 is a partially enlarged longitudinal sectional view showing a construction of a driving mechanism in the above embodiment.

As the driving mechanism 5 for straight driving of the rod 2 in its axial direction, an arbitrary driving mechanism may be used, but a magnet coupling type is used herein. This magnet coupling type driving mechanism 5 is, as shown in FIGS. 1 and 4, supported by a support member 50 and houses the internal moving body 52 within the tube 51 forming a part of the rod housing cylindrical portion 20 and has an external moving body 56 provided outside the tube 51, magnetically coupled to the internal moving body 52.

The internal moving body 52 and the external moving body 56 are provided with body portions 53, 57 constructed by laminating ring-state magnets 53a, 57a magnetized in the axial direction and ring-state yokes 53b, 57b alternately and bonding them to each other. The internal moving body 52 is formed so that its body portion 53 is not in contact with the inner face of the tube 51, and a roller 54 rolling along the inner face of the tube 51 is provided capable of adjustment of a clearance from the tube inner face (contact pressure) at the both ends of the body portion 53 in the axial direction. By this construction, the internal moving body 52 is movable in the non-sliding state inside the tube 51. Also, the external moving body 56 is constructed to be driven in the axial direction by appropriate driving means arranged outside. This driving means preferably uses a shock-less actuator which maximizes an average driving speed.

In place of the magnet coupling type driving mechanism 5, a cylinder capable of straight driving of a piston may be used. Also, in the driving mechanisms 5 including the magnet coupling type driving mechanism 5, if there is a possibility that dust is partially generated, it may be so constituted that the gas including the dust is evacuated in the vicinity of the driving mechanism 5.

The internal moving body 52 in the driving mechanism 5 is provided with a driving shaft 55 protruding from the body portion 53 in the axial direction, and this driving shaft 55 and the rod 2 are connected to each other by the floating joint 6.

Figure 5:
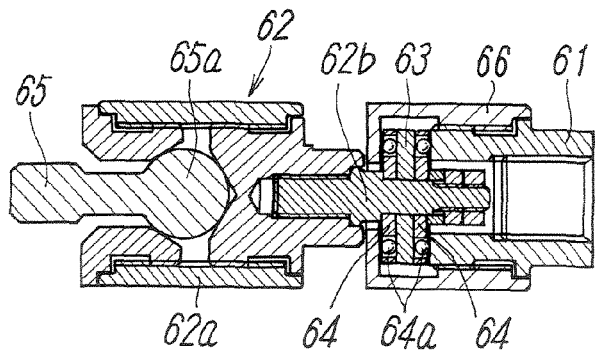
FIG. 5 is a partially enlarged longitudinal sectional view showing a construction of a floating joint in the embodiment.

This floating joint 6 comprises, as shown in detail in FIG. 5, a connecting member 51 connected to the driving shaft 55 of the driving mechanism 5, a parallel moving plate 63 held between the connecting member 61 and a cap 66, movably in the direction crossing the axis of the connecting member 61, a joint member 62 moving in the direction crossing the shaft center of the connecting member 61 integrally with the parallel moving plate 63 by being fixed to the parallel moving plate 63 by a connecting shaft 62b, and an oscillation shaft 65 held capable of oscillation of a ball portion 65a at an oscillation shaft holding portion 62a of the joint member 62. This oscillation shaft 65 is connected to an end of the rod 2.

The parallel moving plate 63 is held by a rolling member 64 having a plurality of balls 64a held by retainers from the both sides and housed so as to be displaced together with the rolling member 64 in the cap 66 in the cylindrical state with a bottom screwed to the end of the connecting member 61.

By interposing the floating joint 6 between the driving shaft 55 of the driving mechanism 5 and the rod 2, axial displacement of the driving shaft 55 in the driving mechanism 5 mechanically bound with the rod 2 supported by the static-pressure gas bearing can be absorbed, but this floating joint may be omitted if not necessary.

Figure 6:
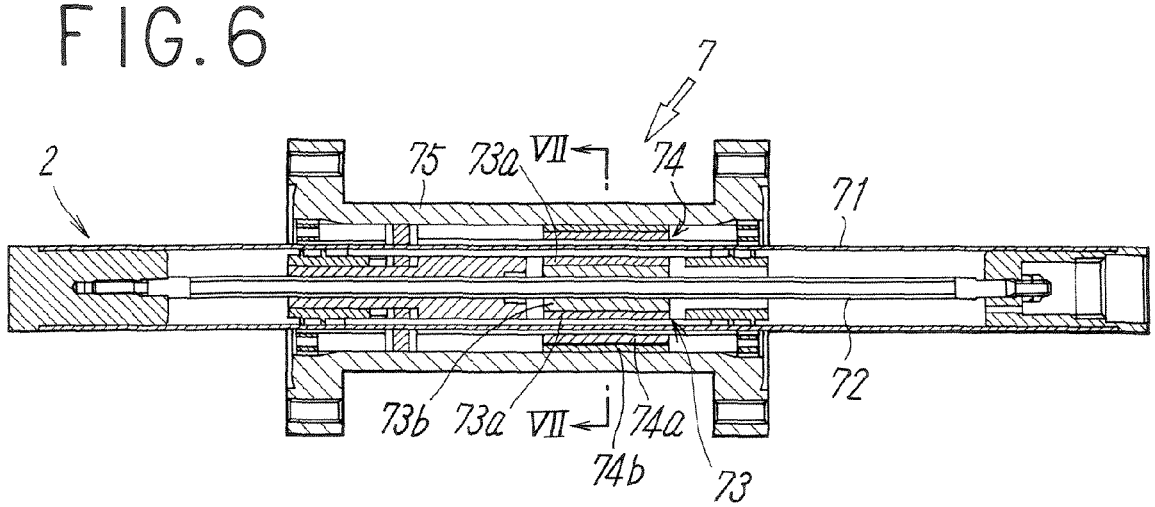
FIG. 6 is a partially enlarged longitudinal sectional view showing a construction of a rotation suppression mechanism in the embodiment.
Figure 7:
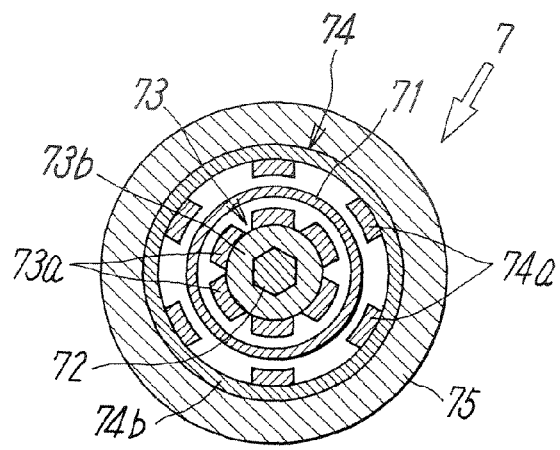
FIG. 7 is a sectional view in VII-VII line in FIG. 6.

Also, the rod 2 is provided with the rotation suppression mechanism 7 for suppressing its rotation. This rotation suppression mechanism 7 is, as shown in FIGS. 6 and 7, disposed at a hollow shaft portion 71 with a circular section formed at the rod 2 for suppressing the rotation of the rod 2 by a magnetic attracting force of an internal magnet assembly 73 mounted to the rod 2 side in the hollow shaft portion 71 and an external magnet assembly 74 provided at a cylindrical housing 75 fixed to the support member 50 outside the hollow shaft portion 71.

More specifically, inside the hollow shaft portion 71, a spline shaft 72 is connected to be integral with the rod 2, and a columnar magnet holder 73b is attached to the spline shaft 72 in the state where it is slidable in the axial direction with respect to the spline shaft 72 but mutually fixed in the rotating direction. And by mounting a plurality of internal magnets 73a on the outer circumference of the magnet holder 73b, the internal magnet assembly 73 is formed. On the other hand, outside the hollow shaft portion 71, the cylindrical housing 75 is fixed between the support block 10 in the second static-pressure gas bearing 32 and the support member 50 in the driving mechanism 5, and by mounting a plurality of external magnets 74a within this cylindrical housing 75 through a cylindrical magnet holder 74b, the external magnet assembly 74 is constructed.

Therefore, even if the rod 2 is driven in the axial direction by the driving mechanism 5, rotation of the rod 2 is suppressed by magnetic bonding of the external magnet assembly 74 and the internal magnet assembly 73 moving on the spline shaft 72 to a position corresponding to it.

In this way, by fixing the position of the external magnet 74 without bringing the external magnet 74 into contact with the hollow shaft portion 71 of the rod 2, rotation suppression of the rod 2 is made possible in the non-contact manner, but if the external magnet 74 is constructed so as to be rotated around the hollow shaft portion 71 of the rod 2, reversing of a work within the process chamber 1 is also made possible.

In the above embodiment, a construction is shown using the magnetic coupling of the internal magnet 73a and the external magnet 74a as the rotation suppression mechanism 7 of the rod, but the rotation suppression mechanism 7 is not limited to such a construction but various rotation suppression mechanisms may be employed by providing a weight at a part of eccentric positions of the rod 2, for example, based on the premise that dust is not generated preferably.

Also, the static-pressure gas bearing mechanism of the present invention has been described for the case where the rod 2 is applied to a vacuum conveying device used in a vacuum environment, but it may be a rod for straight conveying of a work used in a clean environment.

The invention claimed is:

1. A static-pressure gas bearing mechanism comprising:
a rod driven in an axial direction inside a bearing housing, said rod performing an operation at a forward end thereof; and
first and second static-pressure gas bearings disposed, respectively, at first and second positions in the axial direction of the rod, said first and second static-pressure gas bearings for supporting the rod in a non-contact manner by an air layer,
wherein the first static-pressure gas bearing is fixedly supported by the bearing housing and the second static-pressure gas bearing is movably supported by a movable support mechanism of the bearing housing,
the movable support mechanism comprises an actuator to displace a shaft center of the second static-pressure gas bearing relative to the first static-pressure gas bearing, in response to a load on the rod, and a control device for driving the actuator during said displacement in accordance with said load, said displacement of the shaft center of the second static-pressure gas bearing reducing contact between a part of the rod and the first and second static-pressure gas bearings caused by said load,
the rod is a working rod arranged horizontally and having a working instrument at the forward end of the rod, and
the load on the rod is a moment acting on the rod caused by both the weight of a portion of the rod protruding from the first static-pressure gas bearing of the rod and an external force acting on the working instrument is the load on the rod, and the load on the rod is calculated by the control device according to a driving program of the rod, and the actuator is driven based on the calculation result.

2. The static-pressure gas bearing mechanism according to claim 1, wherein a first contact detector for detecting contact of the rod is provided at a first end of the first static-pressure gas bearing, a second contact detector for detecting contact of the rod is provided at a second end of the first static pressure gas bearings, and the control device stops operation of the rod responsive to a rod contact signal from the first contact detector or the second contact detector.

3. The static-pressure gas bearing mechanism according to claim 1, wherein the first static-pressure gas bearing is disposed in a position proximate to the forward end of the rod and the second static-pressure gas bearing is disposed in a position proximate to a rear end of the rod.

4. The static-pressure gas bearing mechanism according to claim 1, wherein an air supply port supplies a compressed air for forming the air layer for the first and the second static-pressure gas bearings, respectively, and a suction port discharges the supplied compressed air.

5. The static-pressure gas bearing mechanism according to claim 1, wherein the actuator comprises a pressure receiving member supporting the second static-pressure gas bearing, and the control device controls a position of the second static-pressure gas bearing through the pressure receiving member by controlling a fluid pressure supplied to the pressure receiving member from a pressure regulating valve.

6. The static-pressure gas bearing mechanism according to claim 5, wherein a first contact detector for detecting contact of the rod is provided at a first end of the first static-pressure gas bearing, a second contact detector for detecting contact of the rod is provided at a second end of the first static pressure gas bearings, and the control device stops operation of the rod responsive to a rod contact signal from the first contact detector or the second contact detector.

* * * * *